April 25, 1961

G. W. ROHWEDER 2,981,400

FOLDABLE CONVEYOR

Filed July 17, 1958

*INVENTOR.*
G. W. ROHWEDER

April 25, 1961 G. W. ROHWEDER 2,981,400
FOLDABLE CONVEYOR
Filed July 17, 1958 2 Sheets-Sheet 2

INVENTOR.
G.W. ROHWEDER

United States Patent Office 2,981,400
Patented Apr. 25, 1961

2,981,400
FOLDABLE CONVEYOR

Glen W. Rohweder, Moline, Ill., assignor, by mesne assignments, to Deere & Company, a corporation of Delaware Filed July 17, 1958, Ser. No. 749,202

12 Claims. (Cl. 198—64)

This invention relates to a conveyor and more particularly to a foldable conveyor having special utility as an unloading auger for the grain tank of a self-propelled combine.

In the field just indicated, foldable unloading augers are known, and in a typical construction the conveyor comprises a first section leading laterally outwardly from the bottom of the combine grain tank and an extension section normally projecting axially from the first section so as to be capable of delivering to a truck, wagon or other vehicle, when the combine is operating. A hinge is normally provided on an upright axis between the two sections so that the outer and longer section may be swung rearwardly so as to occupy a position alongside the machine, thereby reducing the overall width of the machine and facilitating travel thereof on highways, through narrow gates, etc.

Another reason for the use of a folding auger is in the shipment of the combines by rail or other vehicle, at which time the platform is detached, because space is at a premium. It is accordingly desirable to provide an auger that may be readily folded not only for the purposes indicated but for additionally reducing the overall width of the machine during shipment thereof. In the conventional folding auger, the outer section, because of the location of the hinge, necessarily must project beyond the inner section, when folded, by at least the diameter thereof. In large machines, the auger housing diameter is relatively large and the projection of the outer section, as indicated above, is relatively considerable. According to the present invention, the projection is eliminated by the provision of a novel hinge and carrier support combining a track or sliding mount whereby the outer section, when swung rearwardly to its folded position, may also be shifted laterally inwardly, thus bringing the outer section inwardly by at least its own diameter. It is a further feature of the invention to provide a novel mount of the character indicated, which includes means for confining the movement of the outer section to a hinging movement and for selectively capacitating the outer section for both hinging and lateral shifting. In general, the invention features an improved foldable conveyor construction applicable to instances other than those specified and constituting a marked improvement in the specific field noted.

The foregoing and other important objects and desirable features inherent in and encompassed by the invention will become apparent as a preferred embodiment thereof is disclosed, by way of example, in the ensuing specification and accompanying sheets of drawings, the several figures of which are described below.

Figure 1:
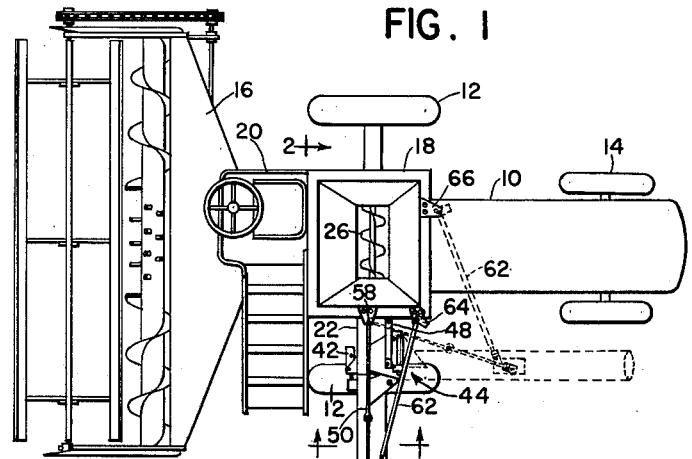
Fig. 1 is a plan view of a typical combine having the foldable conveyor installed thereon.

The combine chosen for purposes of illustration is typical of the ordinary self-propelled combine and the basic components thereof will therefore be described only generally. The combine has a fore-and-aft body 10 carried on front and rear wheels 12 and 14 and mounting at its forward end a transverse header or platform 16. Grain harvested by the platform is fed to the body 10 and when threshed is ultimately delivered to a grain tank 18 located immediately above the front wheels 12 and rearwardly of an operator's station 20.

Grain accumulated in the tank 18 is periodically unloaded to a truck, wagon or other vehicle by means of an unloading auger, here made up of inner and outer normally coaxial sections 22 and 24. The inner section 22 here comprises a tubular housing rigid with the lower portion of the grain tank 18 and containing a discharge auger 26 having a central coaxial shaft which terminates at its outer end in one-half of a shaft coupling 28. The outer auger section is likewise a tubular housing containing an extension auger 30 (Fig. 3) having an inner terminal end formed as a tubular shaft 32 which forms a coupling half mating with the coupling half 28. Lugs 34 and 36 respectively on the parts 28 and 32 cooperate to establish driving connection between the two auger elements 26 and 30, it being understood that the inner auger 26 is supplied with power from any suitable source on the machine.

When the auger housings or sections 22 and 24 are in normal or operating position, their inner ends, as at 38 and 40 respectively, are in abutting relation so that the outer section is a coaxial or end-to-end extension of the inner section 22. The two sections are releasably retained in this position by a toggle lock 42 which affords releasable means for the purpose indicated. The lock may be of any suitable construction and need not duplicate that shown.

Figure 2:
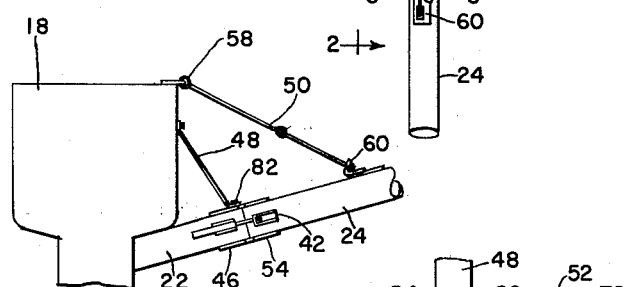
Fig. 2 is a front view of the grain tank and conveyor arrangement as seen generally along the line 2—2 of Fig. 1.
Figure 3:
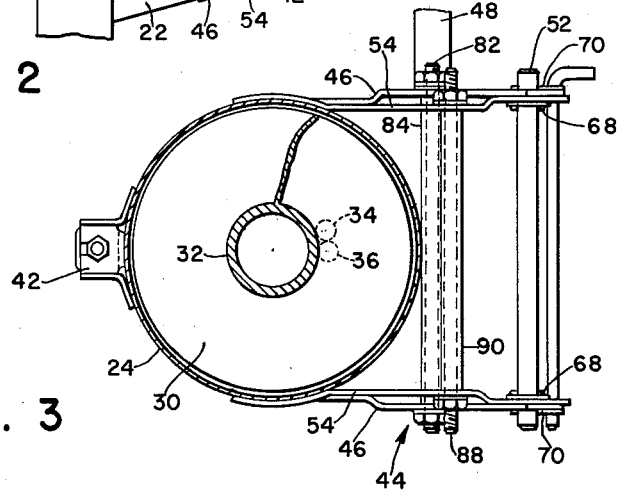
Fig. 3 is an enlarged section on the line 3—3 of Fig. 1.
Figures 4, 5:
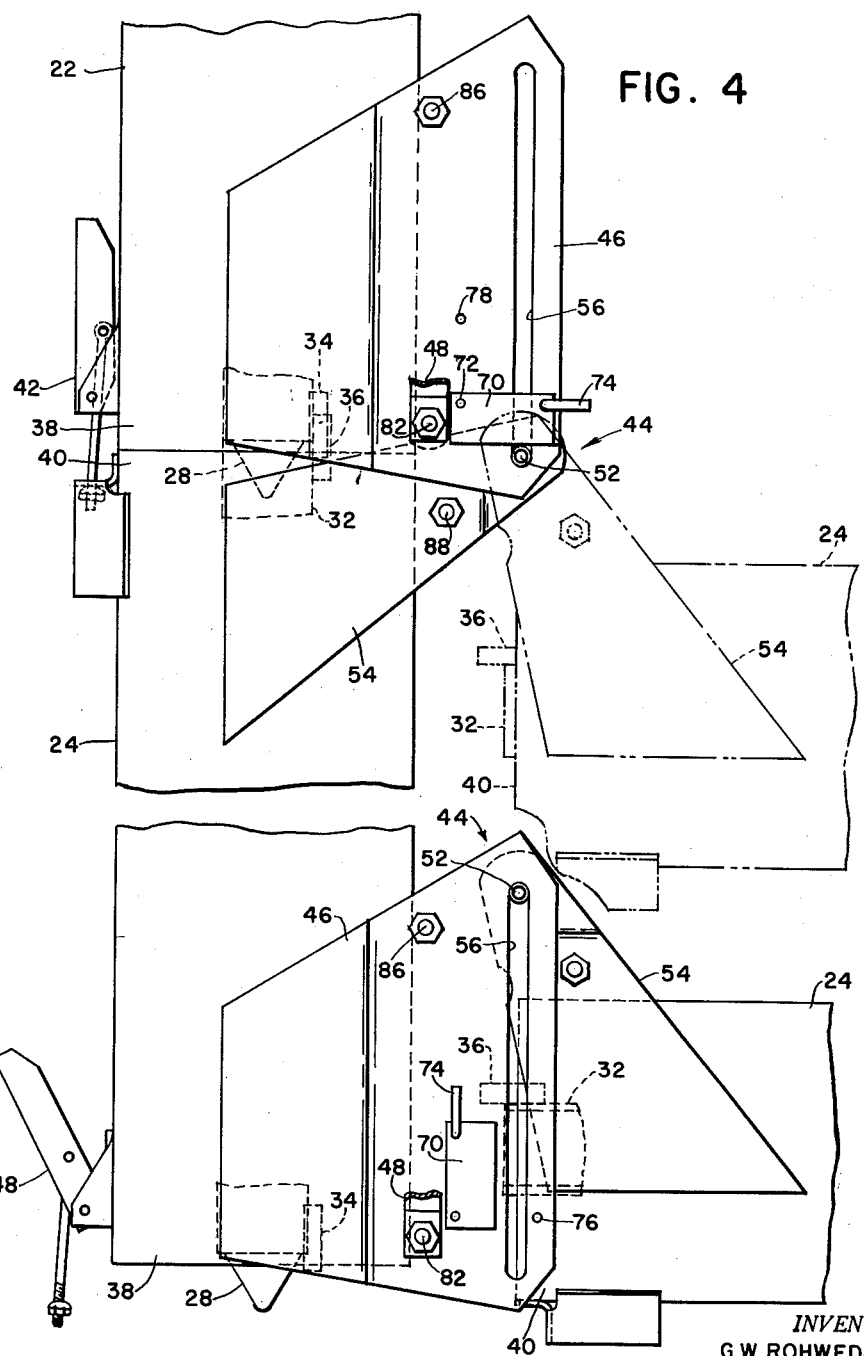
Fig. 4 is a plan view, with portions broken away, showing in full lines the normal or extended relationship of the two conveyor sections and showing in broken lines the hinged or folded position of the outer conveyor section.
Fig. 5 is a similar view but shows the hinged or folded conveyor section shifted laterally inwardly or lengthwise of the inner conveyor section.

The means for mounting the outer section 24 on the inner section 22 is indicated in its entirety by the numeral 44 and is best shown in Figs. 3, 4, and 5 as comprising a pair of vertically spaced apart plates or equivalent members 46 welded or otherwise rigidly secured to diametrically opposite sides of the tubular housing or section 22. Additional rigidity of the section is achieved by a brace 48 between the upper of the plates 46 and the proximate side of the grain tank 18 (Fig. 2). Although the plates are shown in Fig. 3 as being horizontal, in actual construction they are inclined slightly upwardly and to the rear, in addition to which the extent of the connected sections 22 and 24 is one of upward and outward inclination. One reason for this arrangement is to enable the achievement of sufficient height at the outer end of the auger to accommodate relatively high vehicles. Another reason is to obtain coaxiality between the hinge pivot of the outer section 24 and a brace 50 between that section and the grain tank. The hinge pivot is here represented by an upright pin 52 carried by upper and lower plates 54 that are welded or otherwise rigidly secured respectively to the upper and lower diametrically opposed portions of the inner ends of the outer auger section 24. The pin 52 is additionally normally received at the outer end of track means or slots 56 in the inner section support plates 46 and running lengthwise of the inner section 22. The pivot axis for the pin 52, as well as the track means 56, is laterally offset to one side, here to the rear, of the alined auger sections. Because of the inclination of the conveyor and of the plates, as described briefly above, an extension of the pivot axis will coincide with a pivotal connection 58 of the brace 50 to the grain tank. The outer end of the brace may be connected in any suitable manner, as at 60, to the intermediate portion of the outer conveyor housing or section 24. A removable brace 62 is used between the outer section and a rear portion of the grain tank, being disconnectible from the latter at 64 and being reconnectible at 66 when the outer section is in its transport or folded position.

The pivot or hinge pin 52 is confined against axial displacement by means of a pair of cotters 68 (Fig. 3) so that it always remains with the support plates 54 and is capable therefore of running in the tracks 56 in the inner support plates 46. In normal field operation and transport, it is often sufficient to employ the hinge alone without the shifting feature. That is to say, it is often enough that the outer section 24 be hinged rearwardly to the broken line position shown in Fig. 4. For this purpose, releasable means is provided for confining the hinge pin 52 to the outer ends of the track slots 56. This releasable means comprises upper and lower latches 70, pivoted to the plates 46 respectively at 72 for swinging between the positions of Figs. 4 and 5, the former being the positions in which the latch members confine the pivot pin 52 to the outer ends of the track slots 56. A locking pin 74 is passed through apertures in the latch members 70 and through vertically alined apertures 76 in the plates 46 in the Fig. 4 situation. When it is desired to release the latch member 70 so that the pivot pin may be shifted inwardly along the track slots 56, the locking pin 74 is withdrawn, the latch members are swung to the Fig. 5 position and the latch pin 74 is passed through the apertures in the members 70 and through vertically alined apertures 78 in the plates 46 (Fig. 5).

When the outer section 24 is swung rearwardly about its pivot 52, as in Fig. 4, the coupling halves 28 and 32 are automatically separated. As will be seen, the outer section 24, even though swung rearwardly or hinged to its pre-folded position, still projects outwardly beyond the outer terminal end 38 of the inner section 22 by at least its diameter. However, the inner terminal end 40 of the outer section 24 is laterally clear of the outer treminal end 38 of the inner section 22 and this, combined with the mounting of the pin 52 in the rack means 56, enables the outer section to be shifted bodily inwardly or lengthwise of the inner housing section 22, thus reducing the width of the machine in this area by at least the diameter of the outer section. The track means 56 could, of course, be additionally elongated so that the outer section could be moved still further inwardly. However, as best shown in Fig. 1, in its folded position it is well within the width of the vehicle as determined by the transverse dimension between the front wheels 12. The brace 62 is connected at 66 to the grain tank and supports the folded outer section 24 (dotted lines Fig. 1). Because of the inclination of the inner housing section 22, which inclination is also assumed by the plates 46, inward shifting of the outer section will occur largely by gravity and the inner position will tend to be retained and no additional means need be provided to lock it in this inner position.

Rigidity is afforded to the structure by a combination of bolts and spacers. For example, the brace 48 is secured to the plates 46 by a vertical bolt 82 and a tubular spacer 84 is interposed between the two plates and receives the bolt (Fig. 3). The same construction may be duplicated at 86. A similar arrangement of a bolt 88 and a spacer 90 (Fig. 3) is utilized between the plates 54 on the outer section 24.

Details of construction will of course vary according to the environment in which the foldable conveyor is used. The preferred example disclosed performs successfully in the instance in which it is used. However, various modifications and alterations may be made without departure from the principle of the combined pivot and sliding support whereby the outer section may be swung to a pre-folded position and then shifted laterally inwardly to an ultimate position.

What is claimed is:

1. In material-handling apparatus of the class described, the combination of: a first conveyor housing having an outer terminal end; a second conveyor housing having an inner terminal end and normally positioned in alined end-to-end relation to and as an extension of the first housing; and means interconnecting the two housings at said ends, including a hinge having a pivot offset laterally to one side of the alined housings and about which the second housing is swingable to a folded position in which the inner end of the second housing is laterally clear of but offset outwardly beyond the outer end of the first housing, and said interconnecting means including a support carrying the folded second housing for shifting inwardly lengthwise of and relative to the first housing so that said inner end of the folded second housing moves inwardly of and alongside the outer end of the first housing.

2. The invention defined in claim 1, including: releasable means selectively connectible between the housings for retaining the second housing in its normal position.

3. In material-handling apparatus of the class described, the combination of: a first conveyor housing having an outer terminal end; a second conveyor housing having an inner terminal end and normally positioned in alined end-to-end relation to and as an extension of the first housing; means on the first housing affording a track means offset to one side and lengthwise of said first housing, said track means having an outer end adjacent to and an inner end inwardly of the outer end of said first housing; a pivot carried by the second housing and received in the outer end of the track means in the normal position of said second housing and enabling swinging of said second housing to a folded position in which its inner end is laterally clear of the outer end of the first housing, said pivot being then slidable along the track means to carry the folded second housing inwardly relative to the first housing.

4. The invention defined in claim 3, including: releasable means for confining the pivot to the outer end of the track means to enable only swinging of the second housing between its normal and folded positions.

5. The invention defined in claim 3, in which: the track means is inclined downwardly and inwardly to cause the pivot to tend to run toward the inner end of the track means when the second housing is swung to its folded position.

6. The invention defined in claim 5, including: releasable means for confining the pivot to the outer end of the track means to enable only swinging of the second housing between its normal and folded positions.

7. The invention defined in claim 3, in which: the track means includes a pair of spaced apart plates respectively above and below the first housing and said plates respectively have vertically alined slots therein; and the pivot is a vertically elongated pin received at its upper and lower ends respectively in said slots.

8. The invention defined in claim 7, including: upper and lower latch members pivoted respectively to the plates and swingable from blocking positions confining the pin to the outer end of the track means to unblocking positions clear of the pin; and means for releasably holding the latch members in their blocking positions.

9. In combination: a first element having an outer terminal end; a second element having an inner terminal end and normally positioned in alined end-to-end relation to and as an extension of the first element; and means interconnecting the two elements at said ends, including a hinge having a pivot offset laterally to one side of the alined elements and about which the second element is swingable to a folded position in which the inner end of the second element is laterally clear of but offset outwardly beyond the outer end of the first element, and said interconnecting means including a support carrying the folded second element for inward shifting lengthwise of and relative to the first element so that said inner end of the folded second element moves inwardly of and alongside the outer end of the first element.

10. In combination: a first element having an outer terminal end; a second element having an inner terminal end and normally positioned in alined end-to-end relation to and as an extension of the first element; means on the first element affording a track means offset to one side and lengthwise of said first element, said track means having an outer end adjacent to and an inner end inwardly of the outer end of said first element; a pivot carried by the second element and received in the outer end of the track means in the normal position of said second element and enabling swinging of said second element to a folded position in which its inner end is laterally clear of the outer end of the first element, said pivot being then slidable along the track means to carry the folded second element inwardly relative to the first element.

11. The invention defined in claim 10, including: releasable means for confining the pivot to the outer end of the track means to enable only swinging of the second element between its normal and folded positions.

12. In material-handling apparatus of the class described, the combination of: a material container having a side wall; a first conveyor having an inner end adjacent to said side wall and an outer end remote from said side wall; a second conveyor housing having an inner terminal end and normally positioned in alined end-to-end relation to and as an extension of the first housing; and means interconnecting the two housings at said ends, including a hinge having a pivot offset laterally to one side of the alined housings and about which the second housing is swingable to a folded position alongside said side wall and in which the inner end of the second housing is laterally clear of but offset outwardly beyond the outer end of the first housing, and said interconnecting means including a support carrying the folded second housing for shifting inwardly lengthwise of and relative to the first housing so that said inner end of the folded second housing moves inwardly of and alongside the outer end of the first housing so as to dispose said folded second housing closer to said side wall.

References Cited in the file of this patent

UNITED STATES PATENTS

| | | |
|---|---|---|
| 1,039,986 | Merritt | Oct. 1, 1912 |
| 1,448,646 | Ward | Mar. 13, 1923 |
| 2,772,767 | Seifert | Dec. 4, 1956 |

FOREIGN PATENTS

| | | |
|---|---|---|
| 34,657 | Sweden | Feb. 28, 1911 |